(12) United States Patent
Osborne

(10) Patent No.: US 7,051,504 B2
(45) Date of Patent: May 30, 2006

(54) MOVABLE CHUTE APPARATUSES AND METHODS FOR A MOWING MACHINE

(75) Inventor: Christopher M. Osborne, Hillsborough, NC (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 10/751,700

(22) Filed: Jan. 5, 2004

(65) Prior Publication Data
US 2005/0144924 A1  Jul. 7, 2005

(51) Int. Cl.
*A01D 67/00* (2006.01)
(52) U.S. Cl. .................................... 56/320.2
(58) Field of Classification Search ............... 56/320.2, 56/17.4, 17.1, 17.2, 256, DIG. 9, DIG. 24
See application file for complete search history.

(56) References Cited

U.S. PATENT DOCUMENTS

| | | | |
|---|---|---|---|
| 3,423,918 A | | 1/1969 | Siwek |
| 3,706,190 A | * | 12/1972 | Taub ........................ 56/13.4 |
| 3,778,986 A | | 12/1973 | Wright et al. |
| 3,805,499 A | | 4/1974 | Woelffer et al. |
| 3,872,656 A | | 3/1975 | Dahl |
| 4,258,539 A | | 3/1981 | Pearce et al. |
| 4,726,178 A | * | 2/1988 | Mallaney et al. ............. 56/202 |
| 4,897,988 A | | 2/1990 | Schweitz et al. |
| 5,003,757 A | * | 4/1991 | Hill ........................... 56/17.4 |
| 5,195,311 A | | 3/1993 | Holland |
| 5,499,494 A | * | 3/1996 | Boshell et al. ............. 56/320.1 |
| 5,913,804 A | | 6/1999 | Benway |

* cited by examiner

*Primary Examiner*—Árpád Fábián Kovács
(74) *Attorney, Agent, or Firm*—Jenkins, Wilson, Taylor & Hunt, P.A.

(57) ABSTRACT

Chute apparatuses and methods are disclosed for use with a mowing machine to selectively maintain cut grass clippings within the housing, such as for mulching, or to discharge the grass clippings from the housing through a discharge chute by selectively and easily opening the discharge chute. A chute flap attached to a mowing machine is selectively movable from a closed chute flap position where it can provide a portion of the housing for the mowing machine to an open chute flap position where the chute flap can provide a discharge chute for material such as cut grass to exit the housing. A retaining flap is selectively movable from a retaining position to a non-retaining position wherein the retaining flap can in its retaining position provide support to maintain the chute flap in either its closed or open chute flap position. The chute flap and the retaining flap can both be pivotable along different axes.

20 Claims, 9 Drawing Sheets

MOVABLE CHUTE APPARATUSES AND METHODS FOR A MOWING MACHINE

TECHNICAL FIELD

The subject matter disclosed herein is generally directed to chute apparatuses and methods useful for the blade housing of mowing machines such as lawn mowers. More particularly, the present subject matter is directed to chute apparatuses and methods for use with a mowing machine to selectively maintain cut grass clippings within the housing, such as for mulching, or to discharge the grass clippings from the housing through a chute by selectively and easily opening a discharge chute.

BACKGROUND ART

Prior art mowing machines such as mulching lawn mowers typically include a housing or deck that has a flap cut therein. This flap is normally spring loaded and biased in a downward direction. When the flap is down, the deck has a continuous inner and outer surface so as to retain cut grass and other lawn clippings within the housing for mulching and downward ejection from the housing onto the lawn. When the flap is raised, an operator can attach an accessory chute at the opening to direct cut grass out of and away from the housing. The accessory chute is typically attached by lifting the flap, placing the accessory chute under the flap, extending fingers on the accessory chute partially around the pivot point of the flap, and releasing the flap. The accessory chute is held in place by the pressure of the flap on the accessory chute.

As can readily be appreciated by persons skilled in the art, this prior art arrangement has numerous disadvantages. First and foremost, requiring a separate removable accessory for ejecting lawn clippings out and away from the mower is inefficient and inconvenient. An operator often places the chute away from the mower, leading to tedious trips back and forth from the mower storage area, and often resulting in loss of the accessory. Secondly, the irregular shape of a typical accessory chute makes it inconvenient to permanently attach to a typical mulching mower. It can be appreciated that any attempt to permanently attach a typical accessory chute to a mulching mower would result in an unwieldy and less maneuverable mower.

One typical chute is shown in U.S. Pat. No. 4,897,988 to Schweitz et al. The flap containing a unitary curved surface forms a chute for deflecting cut grass out and away from the housing (FIGS. 1–9). The flap is also able to rotate around a horizontal axis in order to attach a larger chute or collection bag. Despite this structure, there still is no way to close the housing so as to enter a mulching mode. Another integrated chute design is found in U.S. Pat. No. 5,195,311 to Holland, which employs a spring loaded flap that rotates about a vertical axis (FIGS. 16 and 17). The flap is biased away from the housing and is designed to collapse if it contacts an obstacle, but the flap is not designed to operate in two distinct modes. The chute described by Holland is not capable of securing against the housing wall so as to enter a mulching mode, and there is likewise no securing mechanism to keep the chute secured in its open position.

It would therefore be advantageous to provide chute apparatuses and methods for use with a mowing machine to selectively maintain cut grass clippings within the housing, such as for mulching, or to discharge the grass clippings from the housing through a chute by selectively and easily opening a discharge chute without the need for tools or other separate attachments.

SUMMARY

The subject matter disclosed herein provides movable chute apparatuses and methods for use with mowing machines such as lawn mowers. In one embodiment, a chute apparatus can comprise a chute flap movable about an axis between a closed chute flap position and an open chute flap position, and a retaining flap movable about a different axis between a retaining position and a non-retaining position. The chute flap can be pivotally attached to the deck of a housing of a mowing machine and comprise a flange portion for attachment of the chute flap to the deck of the housing. The chute flap can also comprise a wall portion which in the closed chute flap position can serve as a portion of the outer wall of the housing. In the open chute flap position, the chute flap can serve as a discharge chute for deflecting cut material such as grass clippings expelled from within the housing.

The retaining flap can be biased in its retaining position if desired and can, when the retaining flap is in its retaining position, secure and maintain the chute flap in its closed chute flap position such that the chute flap serves as a portion of the wall of the housing of the mowing machine. This configuration is advantageous when it is desirable to use the mowing machine without discharging the cut material such as grass clippings from the housing, such as for mulching. The chute flap can be biased in its open chute flap position. To simply and easily convert the chute apparatus to a configuration for discharging cut material from the housing, the retaining flap can be lifted to its non-retaining position, and the chute flap can thereby be released or manually moved to its open chute flap position. Once the chute flap is in its open chute flap position, the retaining flap can be moved back to its retaining position where it can provide physical support to maintain the chute flap in its open chute flap position.

In another embodiment, a chute apparatus can comprise a chute flap movable about an axis between a closed chute flap position and an open chute flap position, and a retaining flap movable about a different axis between a retaining position and a non-retaining position. The chute flap can be pivotally attached to the outer wall of a housing of a mowing machine and biased in either direction as desired although it is envisioned that the chute flap be biased toward its open chute flap position. The chute flap can comprise a wall portion which in the closed chute flap position can serve as a portion of the outer wall of the housing. In the open chute flap position, the chute flap can serve as a discharge chute for deflecting cut material such as grass clippings expelled from within the housing.

The retaining flap can be biased in its retaining position if desired and can, when the retaining flap is in its retaining position, maintain the chute flap in its closed chute flap position such that the chute flap serves as a portion of the wall of the housing of the mowing machine. This configuration is advantageous when it is desirable to use the mowing machine without discharging the cut material such as grass clippings from the housing, such as for mulching. To simply and easily convert the chute apparatus to a configuration for discharging cut material from the housing, the retaining flap can be lifted to its non-retaining position, and the chute flap can be moved to its open chute flap position. Once the chute flap is in its open chute flap position, the retaining flap can be moved back to its retaining position where it can provide a physical support for maintaining the chute flap in its open chute flap position.

Methods are also provided for moving a chute apparatus of a mowing machine. The methods generally comprise lifting a retaining flap on a mowing machine from a retaining position to a non-retaining position to allow a chute flap attached to the mowing machine to move from a closed position to an open position whereby the chute flap provides a discharge chute.

It is therefore an object to provide novel chute apparatuses and methods for use with a mowing machine to selectively maintain cut grass clippings within the housing, such as for mulching, or to discharge the grass clippings from the housing through a chute by selectively and easily opening a discharge chute.

An object of the presently disclosed subject matter having been stated hereinabove, which is achieved in whole or in part by the present subject matter, other objects will become evident as the description proceeds when taken in connection with the accompanying drawings as best described herein below.

DETAILED DESCRIPTION

Figure 1:
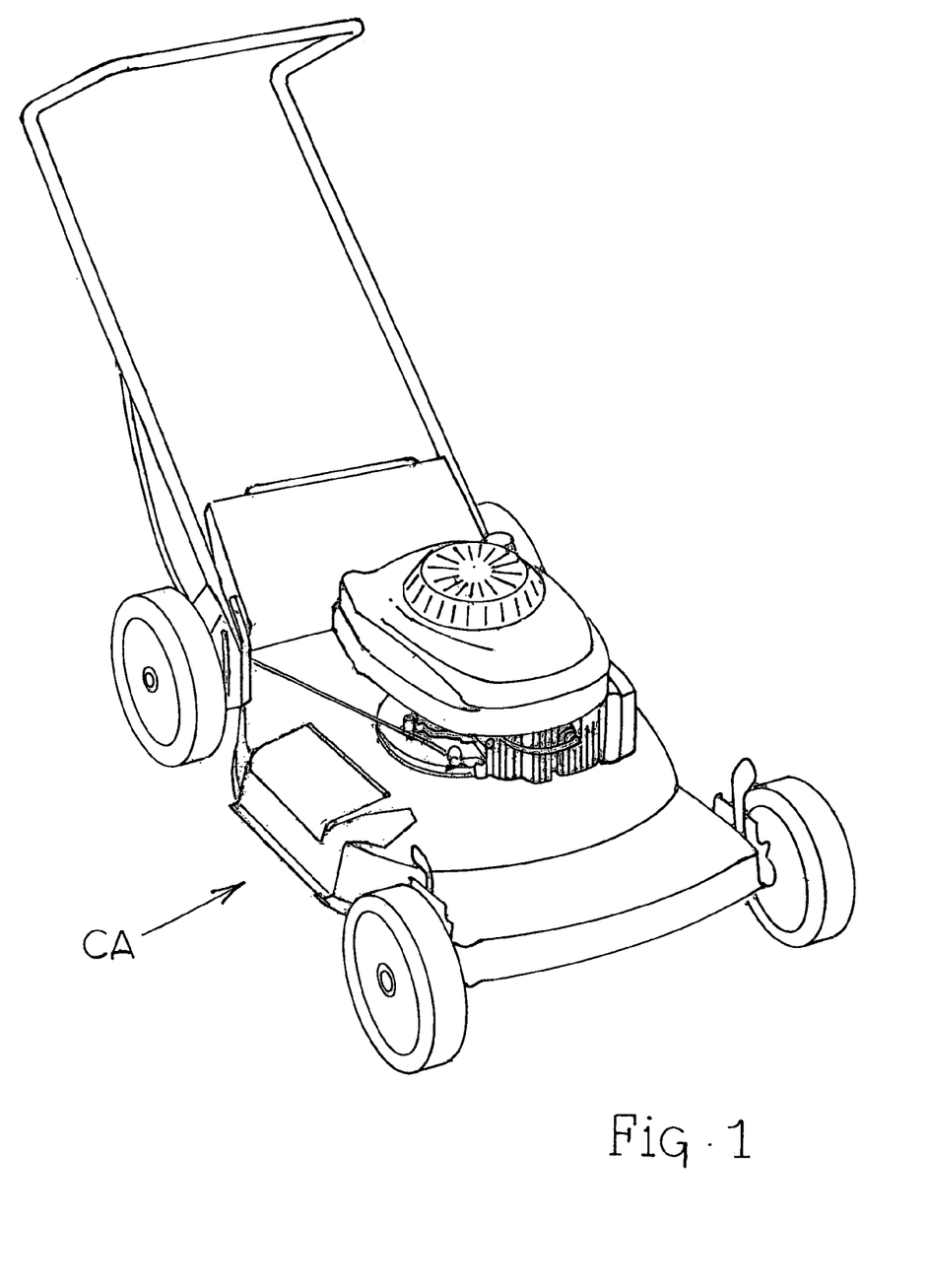
FIG. 1 is a perspective view of a mowing machine with an embodiment of the movable chute apparatus.

In accordance with the presently disclosed subject matter, and referring now to FIGS. 1, 2A, 2B, 2C, 3, and 4, an embodiment of a movable chute apparatus, generally designated CA, is shown for attachment to mowing machines such as a lawn mower, as shown in FIG. 1. Chute apparatus CA can be used for selectively and easily switching from what may be referred to as a closed or mulching configuration to what may be referred to as an open configuration. In the closed configuration, chute apparatus CA is adapted for preventing material such as cut grass clippings from being discharged from a housing H of the mowing machine. In the open configuration, chute apparatus CA is adapted for providing a discharge chute for passage of cut material such as cut grass clippings expelled and exiting from housing H. As readily appreciated, housing H can house a cutting mechanism (not shown), such as a blade of a mowing machine, and housing H can comprise an upper deck D and an outer wall W, both of which typically are constructed of metal or plastic. Upper deck D and outer wall W can be suitably positioned with respect to one another and are usually substantially perpendicular to one another as shown. Both upper deck D and outer wall W serve to contain cut material such as cut grass clippings within housing H during operation of the mowing machine.

Chute apparatus CA as illustrated in FIGS. 1, 2A, 2B, 2C, 3 and 4 comprises a chute flap CF and a retaining flap RF. Retaining flap RF can be pivotally attached to housing H such as by use of any suitable pivotal connection 10 which can also include one or more biasing members such as, for example, a torsion spring 12 to bias retaining flap RF toward its retaining position. Retaining flap RF is rotatably movable along a first axis X1 between a retaining position shown in FIG. 2A and a non-retaining position shown in FIG. 2B as discussed below. First axis X1 can be parallel or co-planar with deck D. Retaining flap RF can include a first portion 14 and a second portion 16. First portion 14 can be flat and extend along a plane from pivotal connection 10 with second portion 16 preferably rigidly extending from first portion 14 and also being flat but extending along a different plane than first portion 14 and preferably at least generally perpendicular from first portion 14. As shown, retaining flap RF can include a number of edges such as the opposing side edges 18A and 18B of first portion 14, opposing side edges 20A and 20B of second portion 16, and end edge 22 of second portion 16.

Figure 2A:
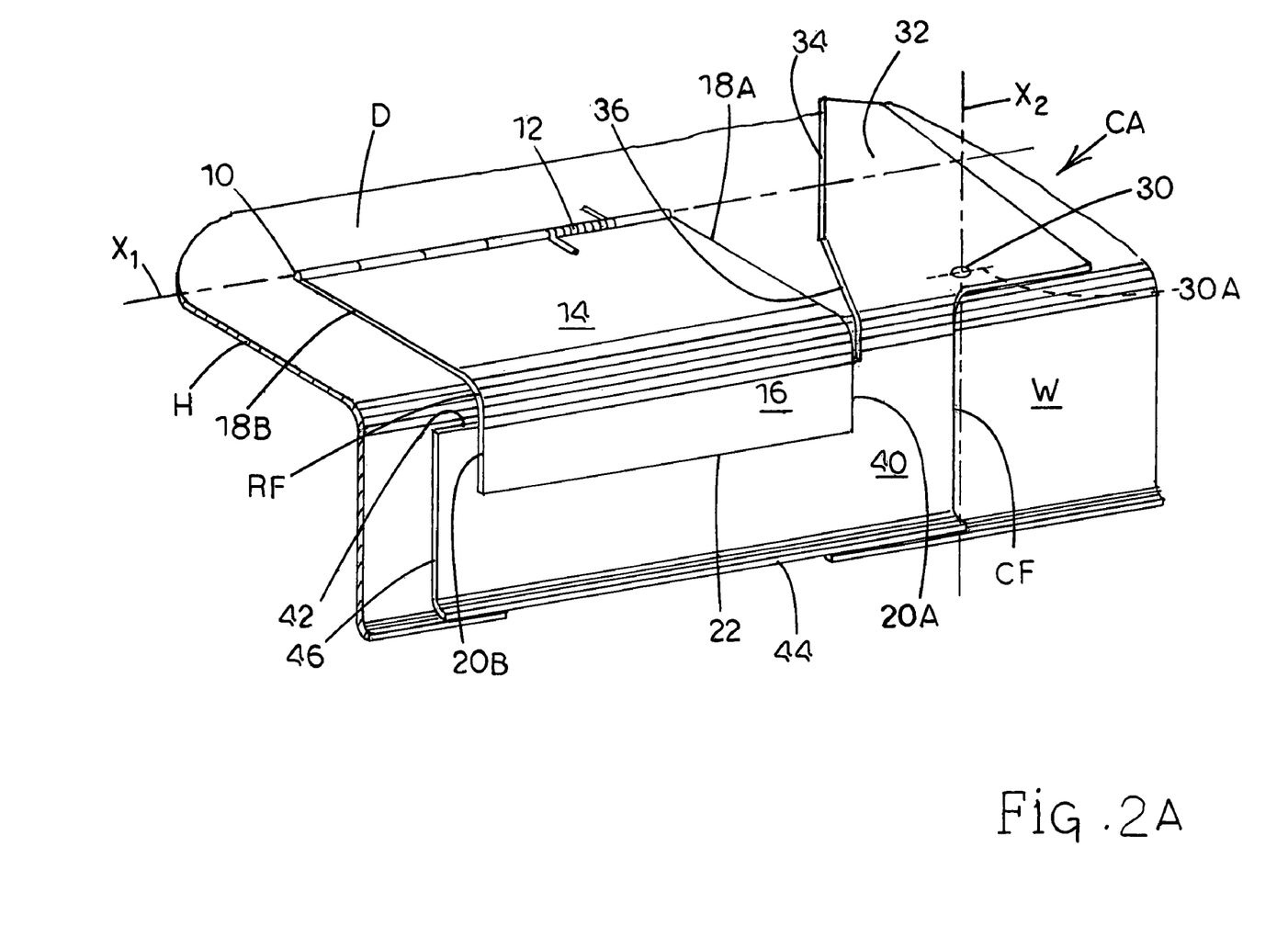
FIG. 2A is a closer, perspective view of an embodiment of the movable chute apparatus in a configuration adapted for maintaining material such as cut grass within the housing of the mowing machine.
Figure 2B:
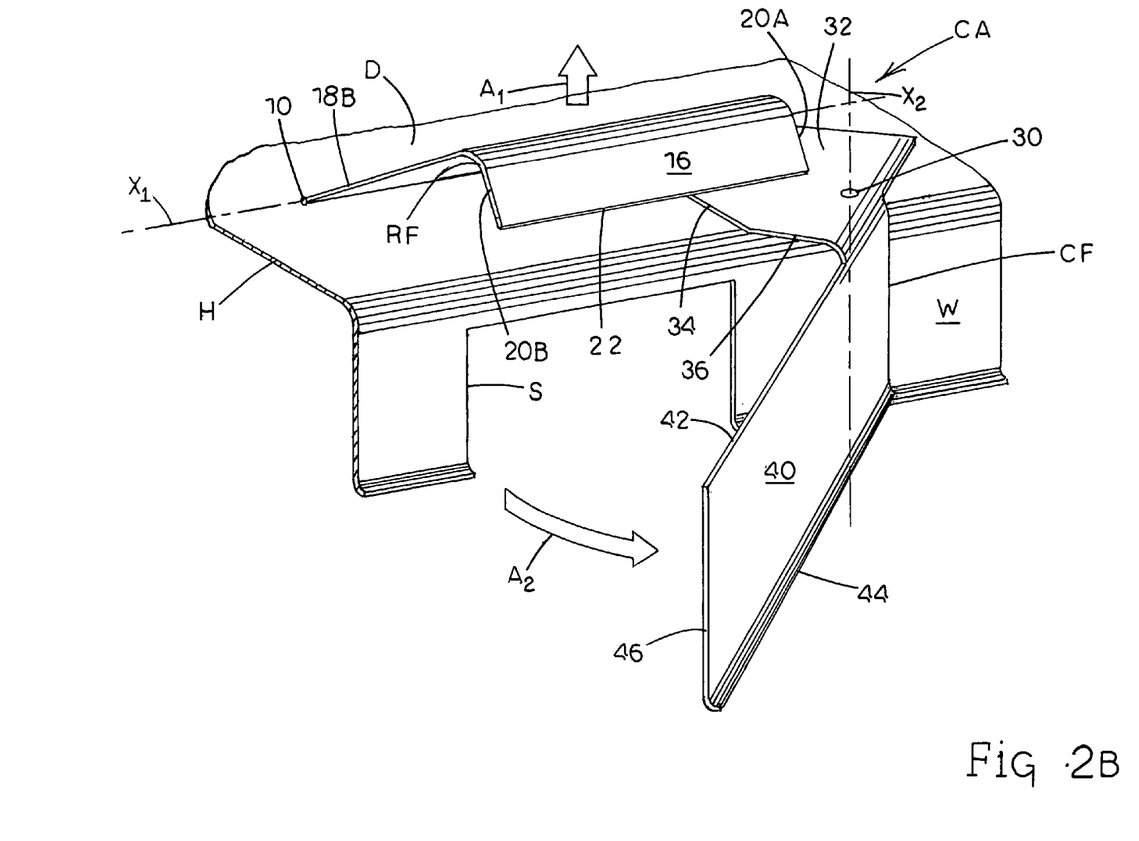
FIG. 2B is a perspective view of the chute apparatus shown in FIG. 2A with the chute apparatus moving toward a configuration adapted for discharge of material such as cut grass from the mowing machine housing.
Figure 2C:
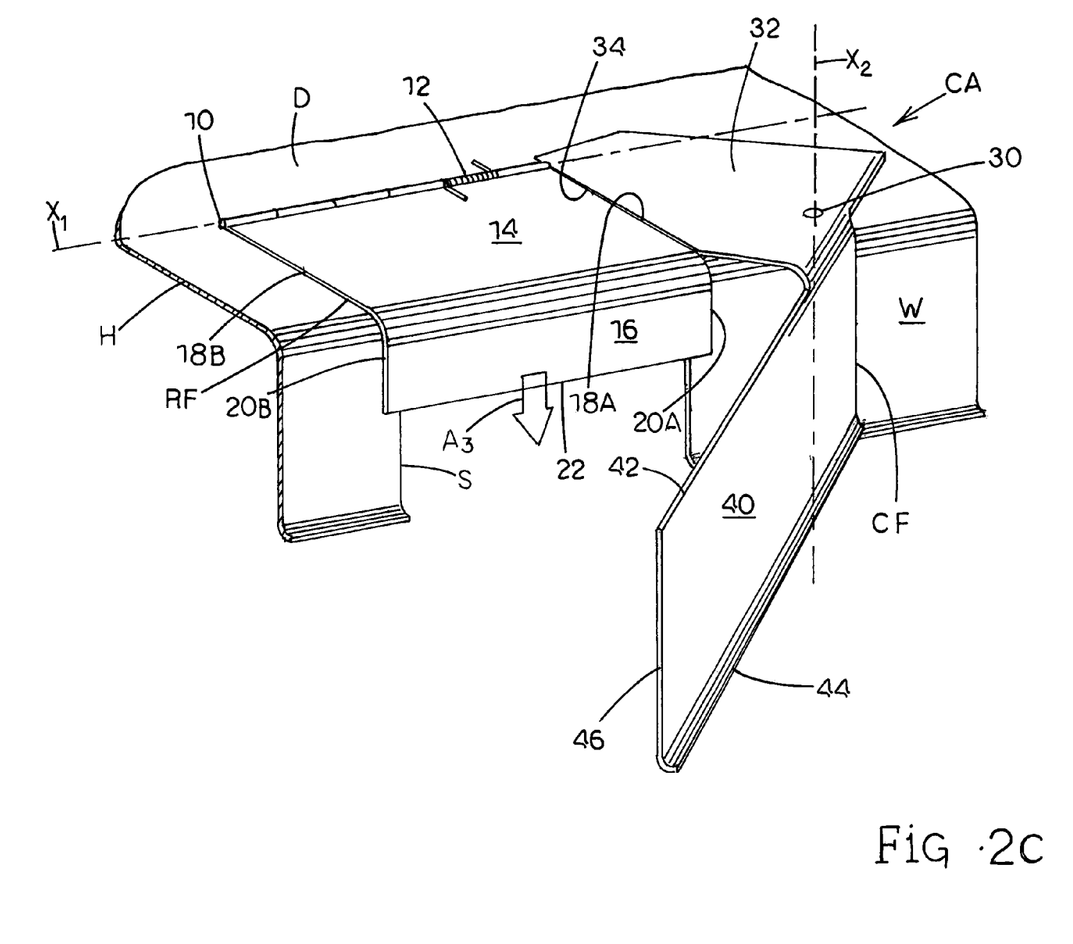
FIG. 2C is a perspective view of the chute apparatus shown in FIGS. 2A and 2B in a configuration adapted for discharge of material such as cut grass from the mowing machine housing.

Chute flap CF as shown in FIGS. 1, 2A, 2B and 2C can be pivotally attached to housing H, such as at a pivot point created by attachment of chute flap CF to housing H through the use of fastener 30, and is rotatably movable along a second axis X2 between a closed chute flap position shown in FIG. 2A and an open chute flap position shown in FIG. 2C. Second axis X2 extends through fastener 30 and can be at least generally parallel with wall W of housing H and at least generally perpendicular with first axis X1 associated with retaining flap RF. Chute flap CF can include a flange portion 32 through which fastener 30 can extend and which can be flat and positioned above deck D. One or more biasing structures can be used to suitably bias chute flap CF in either its open chute flap position or its closed chute flap position as desired. It is envisioned though that chute flap CF can typically be biased toward its closed chute flap position, such as by a torsion spring 30A as shown as one example beneath flange portion 32. Flange portion 32 can include a number of side edges, such as side edges 34 and 36, and side edge 34 can be structured and configured to rest against side edge 18A of retaining flap RF to provide physical support to maintain chute flap CF in its open chute flap position when chute flap CF is in its open chute flap position and retaining flap RF is in its retaining position. Flange portion 32 can be rigidly formed as an extension from or connected with wall portion 40 of chute flap CF.

Wall portion 40 of chute flap CF preferably is of a shape adapted to cover an opening or slot S (best shown in FIG. 2B) defined in housing H when chute flap CF is in its closed chute flap position (FIG. 2A) as well as to provide a discharge chute when chute flap CF is in its open chute flap position (FIG. 2C). As shown in FIGS. 1, 2A, 2B, 2C, 3 and 4, wall portion 40 can extend in a vertical orientation with respect to and at least generally perpendicular to flange portion 32. Wall portion 40 can be of any suitable shape or configuration such as, for example the configuration illustrated in FIGS. 1, 2A, 2B, 2C, 3 and 4, and can include top edge 42, opposing bottom edge 44, and outermost wide edge 46. Any suitable material or materials can be used for construction of chute flap CF or retaining flap RF, such as metal or hardened plastic.

Chute apparatus CA is shown in FIG. 2A in a configuration advantageous when it is desirable to use a mowing machine without a bag or without discharging the grass clippings, such as for mulching cut grass clippings. As shown in FIG. 2A, chute flap CF is in its closed chute flap position and retaining flap RF is in its retaining position. First portion 14 of retaining flap RF rests flat upon at least a portion of housing H in a parallel relationship. Second portion 16 of retaining flap RF is positioned at least generally parallel to wall W but spaced a small distance apart from wall W such that second portion 16 can overlap a portion of chute flap CF to retain chute flap CF in its closed chute flap position as wall portion 40 of chute flap CF provides and serves as a portion of outer wall W of housing H. If desired, wall portion 40 of chute flap CF and second portion 16 of retaining flap RF can have a parallel relationship when chute flap CF is in its closed chute flap position and biased and maintained in that position by retaining flap RF in its retaining position. A parallel relationship can exist between flange portion 32 and first portion 14 of retaining flap RF when chute flap CF is in its closed chute position and retaining flap RF is in its retaining position. It is noted that chute flap CF can also include biasing structure for urging chute flap CF in either its closed chute flap position or its open chute flap position. It is also noted that retaining flap RF can also be in its retaining position without chute flap CF being in its closed chute flap position. In the configuration shown in FIG. 2A, chute apparatus CA serves to retain cut material such as grass clippings within housing H, such as for mulching.

Although retaining flap RF can be biased by torsion spring 12 toward its retaining position, retaining flap RF is pivotally movable, as shown in FIG. 2B, on pivot connection 10 in the direction of arrow A1 at least generally upwardly and at least partially away from wall W and some of deck D. As shown in FIG. 2B, retaining flap RF has been moved from its retaining position and is moving toward or even can be said to have reached its non-retaining position where end edge 22 of retaining flap RF has been raised from its position shown in FIG. 2A to free or release chute flap CF to move away from its closed chute flap position. Chute flap CF is shown moving toward its open chute flap position in the direction of arrow A2 as wall portion 40 of chute flap CF moves away from wall W of housing H to expose slot S defined in wall W. As can be readily appreciated, slot S can be defined in housing H in any suitable shape and size and can be defined only in wall W if desired or can be defined in both wall W and extend to be defined in a portion of deck D preferably adjacent that portion of wall W defining slot S, as shown for example in and discussed hereinbelow with reference to FIG. 5B. If slot S is defined in a portion of deck D, it can be understood that the underneath side of first portion 14 of retaining flap RF can serve as a portion of deck D of housing H when the retaining flap is in its retaining position.

FIG. 2C illustrates chute apparatus CA in its open configuration where it can allow cut material such as grass clippings to exit from within housing H. This position can be useful when mulching is not desired and when it is instead desirable to allow cut material to be expelled or discharged from housing H simply onto a lawn directly or into a bag for collection. As shown, chute flap CF has reached and is in its open chute flap position where wall portion 40 of chute flap CF no longer covers slot S and instead helps provide a discharge chute or wall for deflecting cut material discharging from housing H. While retaining flap RF no longer retains chute flap CF in its closed chute flap position, retaining flap RF has moved in the direction of arrow A3 back to its retaining position and preferably provides physical support to maintain chute flap CF in its open chute flap position. More specifically, side edge 34 of chute flap CF can rest against side edge 18A of retaining flap RF when retaining flap RF is in its retaining position and chute flap CF is in its open chute flap position to maintain chute flap CF in that position. This support can be especially beneficial if chute flap CF is biased toward its open chute flap position, and it can also be easier for retaining flap RF to be moved back to its non-retaining position when retaining flap RF is biased toward its retaining position.

To return chute apparatus CA to its closed configuration such as for mulching, retaining flap RF can simply be lifted to again move to its non-retaining position and which removes the previous physical support for chute flap CF and releases or frees chute flap CF to be manually moved or moved as a result of its biasing structure from its open chute flap position back to its closed chute flap position as shown in FIG. 2A. Once chute flap CF is back in this position, retaining flap RF can be manually moved or moved as a result of its biasing structure back to its retaining position as shown in FIG. 2A where at least a portion of second portion 16 of retaining flap RF overlaps or overhangs a portion of wall portion 40 of chute flap CF to retain chute flap CF in its closed chute flap position. Biasing retaining flap RF in its retaining position such as with torsion spring 12 can facilitate changing the configuration of chute apparatus CA as can be appreciated by those of skill in the art. Biasing chute flap CF in its open chute flap position such as with torsion spring 30A can also facilitate changing the configuration of chute apparatus CA as can be appreciated by those of skill in the art.

Figure 3:
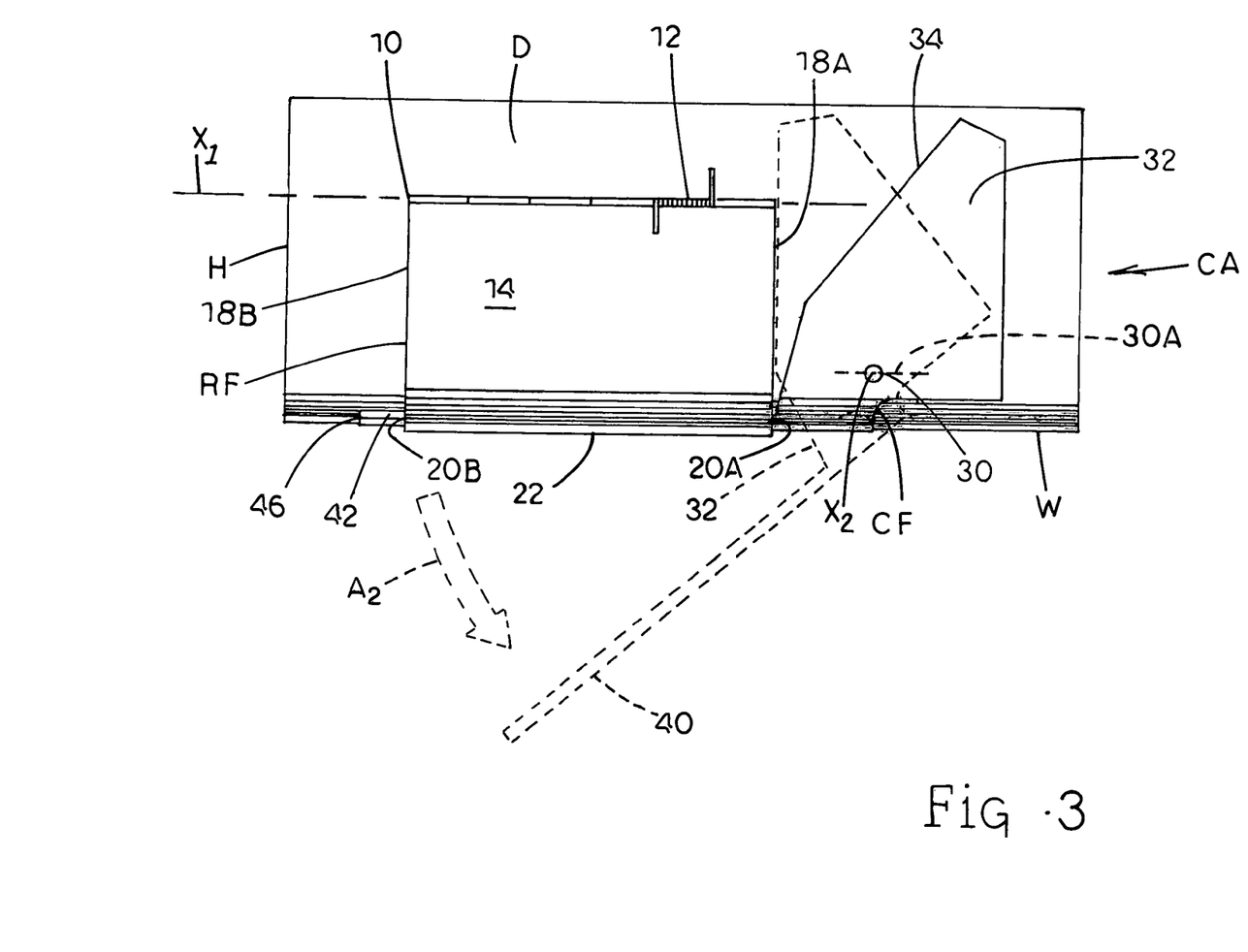
FIG. 3 is a top plan view of the chute apparatus shown in FIGS. 2A, 2B and 2C.
Figure 4:
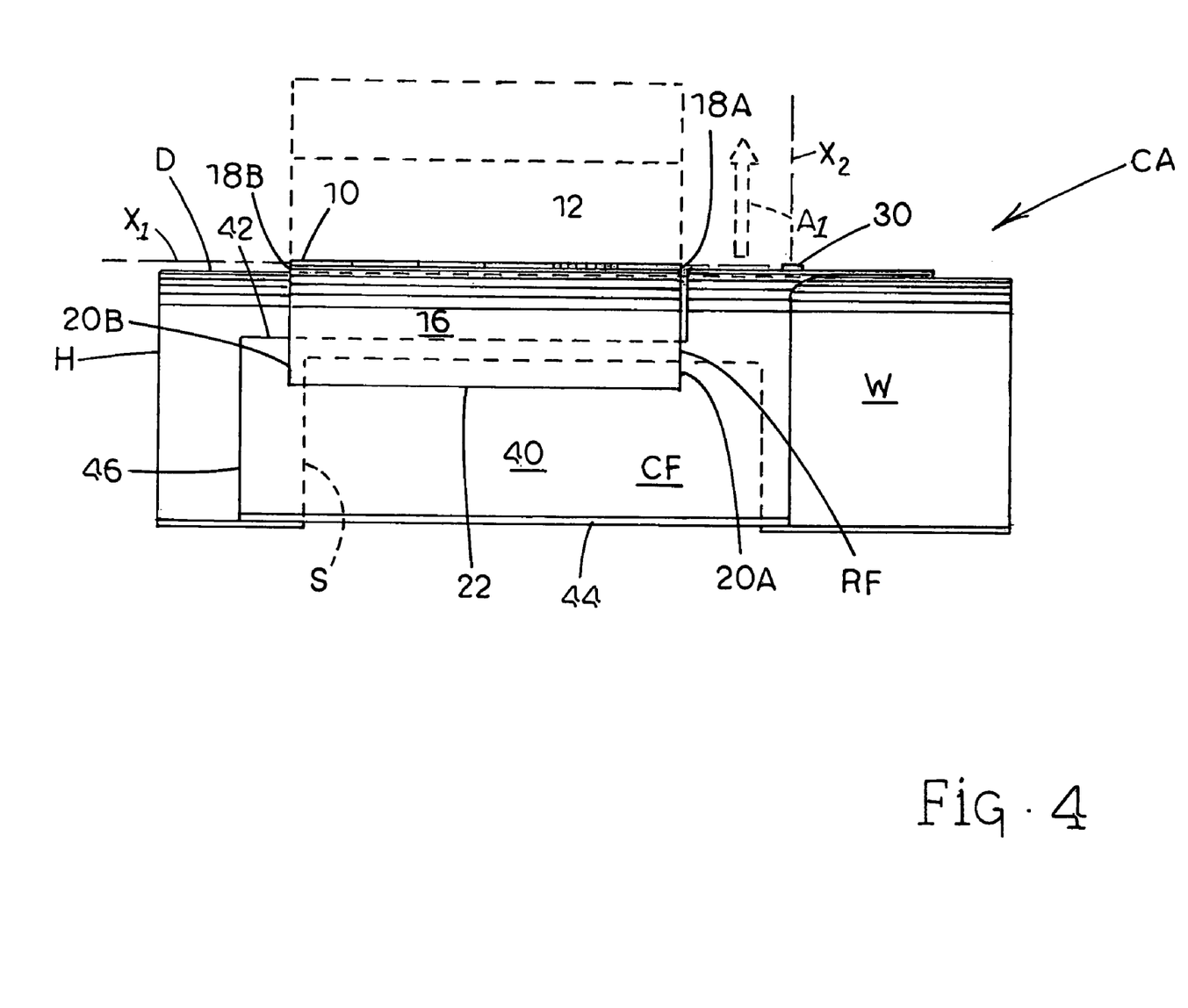
FIG. 4 is a side elevation view of the chute apparatus shown in FIGS. 2A, 2B and 2C.

FIG. 3 is a top plan view and FIG. 4 is a side elevation view of chute apparatus CA as shown in FIGS. 1, 2A, 2B and 2C. The pivotal movements of retaining flap RF about first axis X1 and chute flap CF about second axis X2 are shown with phantom lines for purposes of illustration. FIG. 3 also illustrates the abutment of edge 34 of flange portion 32 of chute flap CF with side edge 18A of first portion 14 of retaining flap RF.

Figure 5A:
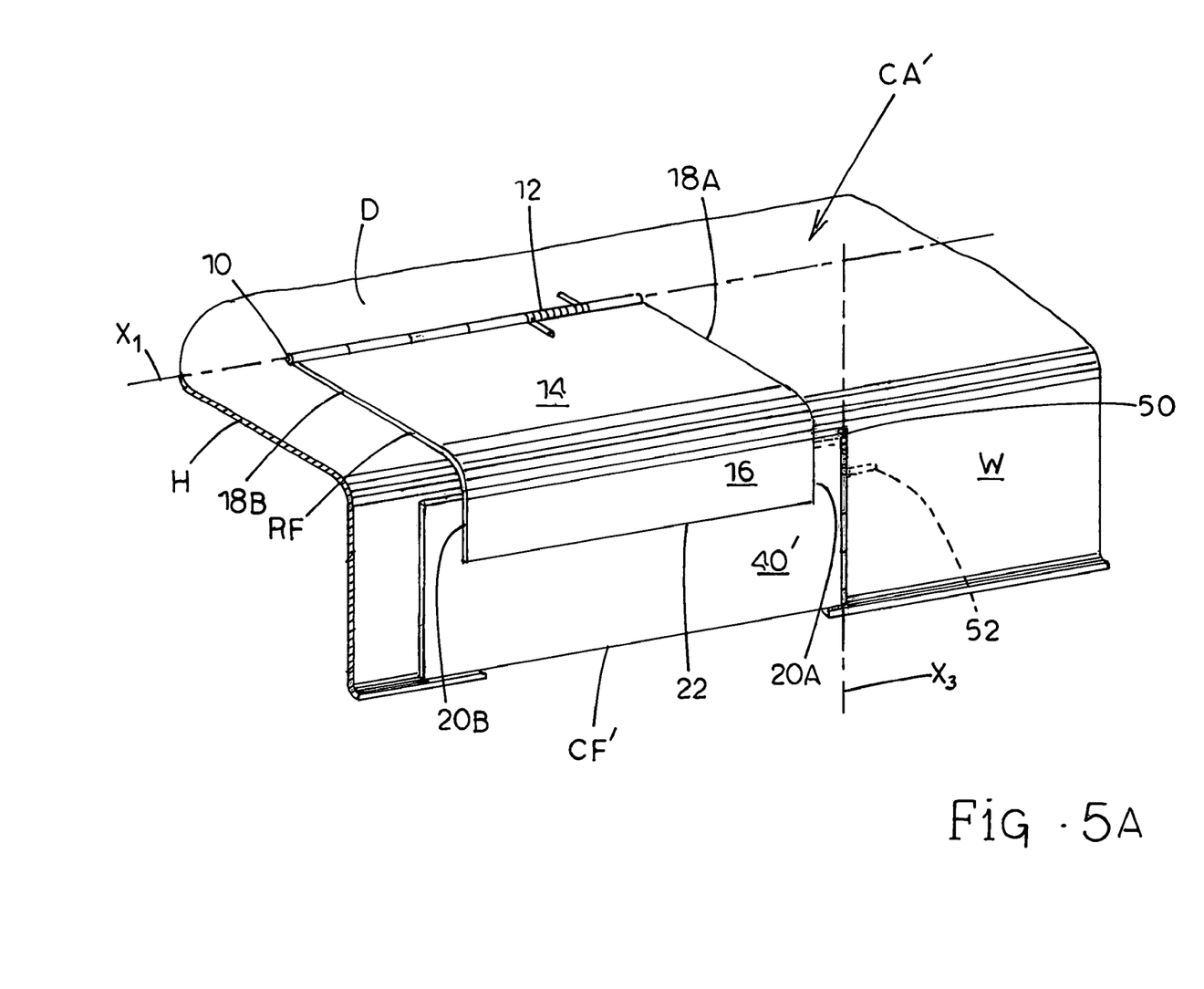
FIG. 5A is a perspective view of another embodiment of a chute apparatus in a configuration adapted for maintaining material such as cut grass within the housing of the mowing machine.
Figure 5B:
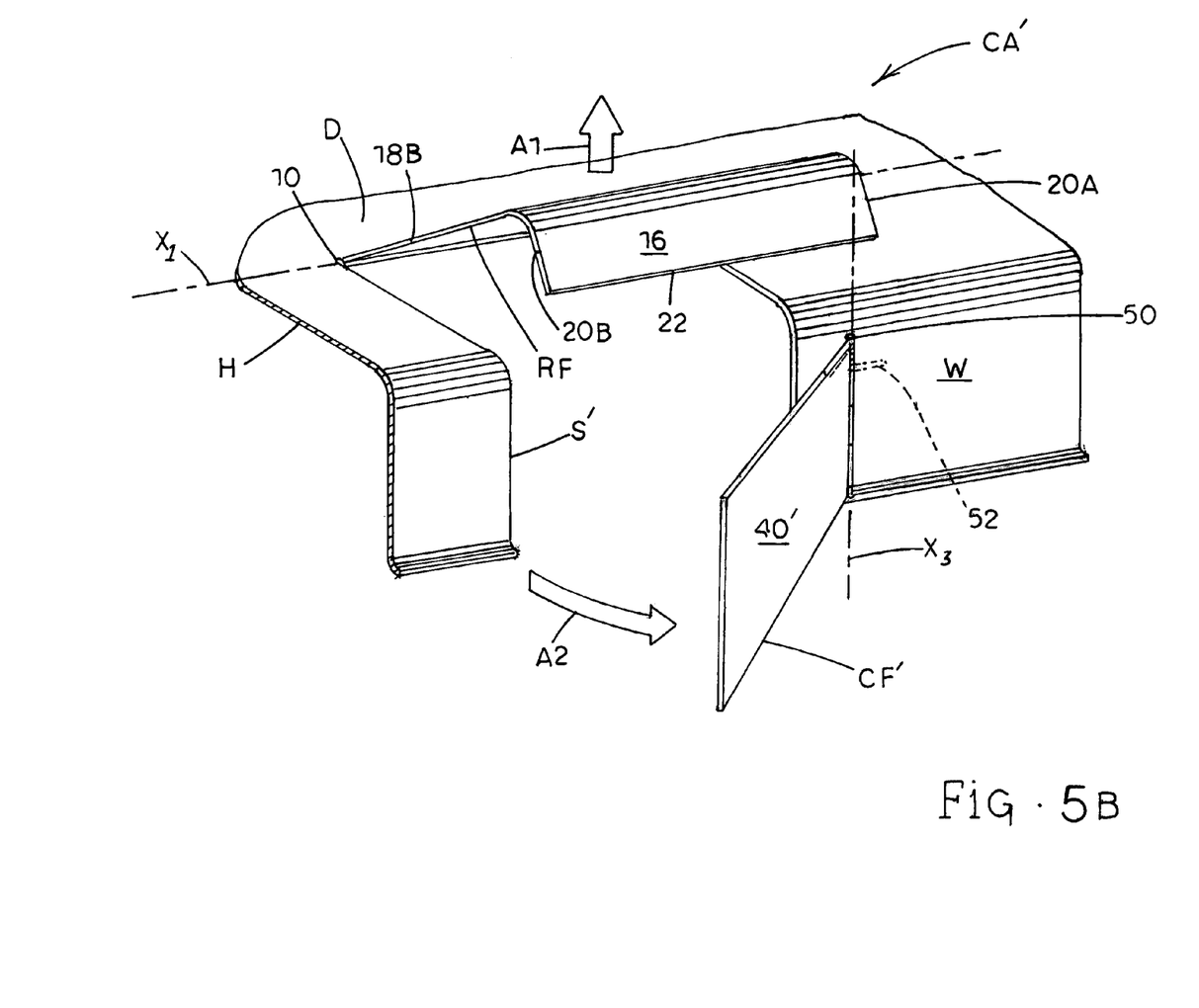
FIG. 5B is a perspective view of the chute apparatus shown in FIG. 4A moving toward a configuration adapted for discharge of material such as cut grass from the mowing machine housing.
Figure 5C:
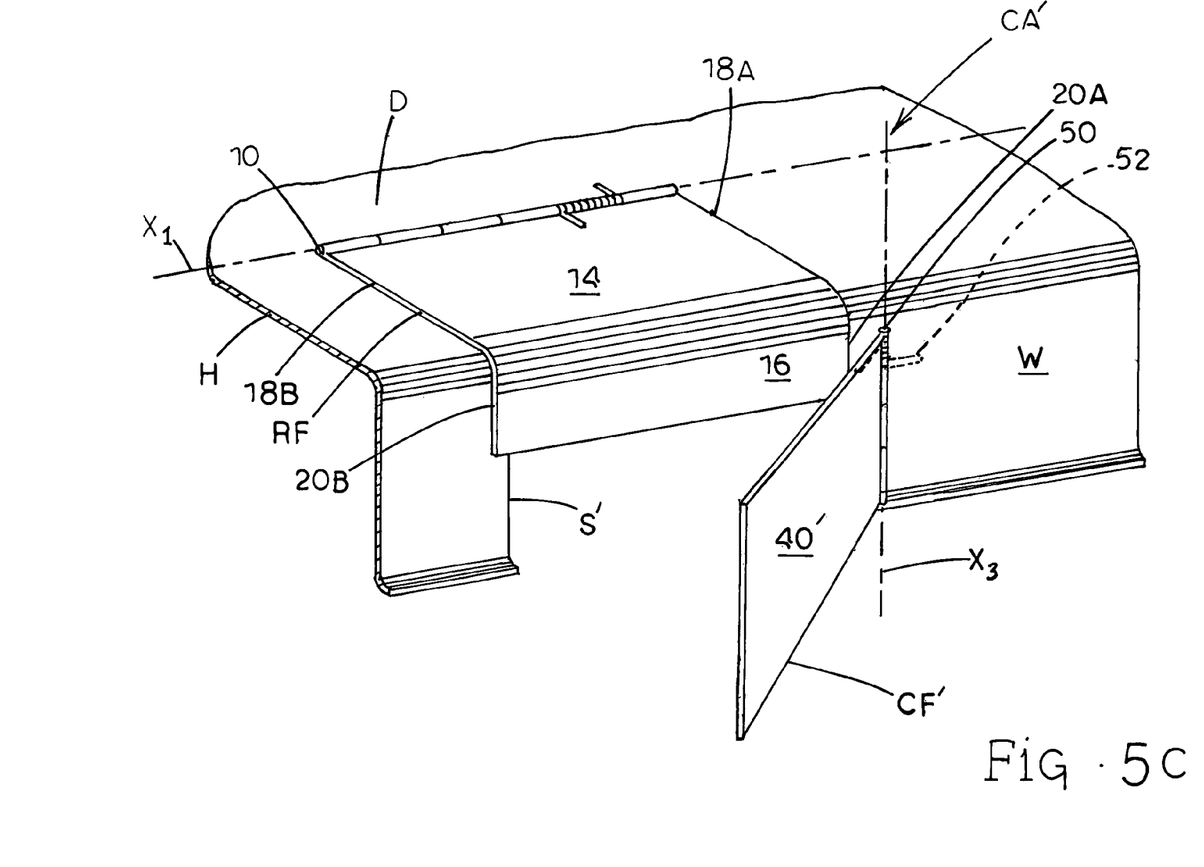
FIG. 5C is a perspective view of the chute apparatus shown in FIGS. 5A and 5B in a configuration adapted for discharge of material such as cut grass from the mowing machine housing.

FIGS. 5A, 5B and 5C illustrate another embodiment of a chute apparatus CA'. Housing H with deck D and outer wall W can be the same as shown in FIGS. 1, 2A, 2B, 2C, 3 and 4. Retaining flap RF can also be the same. Slot S' though is shown defined in a portion of wall W as with the previous figures of drawings, but also can be extended and defined in a portion of deck D, as best shown in FIG. 5B.

Chute flap CF' of chute apparatus CA' is different from chute flap CF from the previous figures of drawings by comprising basically a wall portion 40' which is pivotally attached proximate or at an end thereof to wall W of housing H so as to be movable about at least substantially vertical axis X3 from the closed chute flap position of FIG. 5A, to the intermediate position of FIG. 5B, and then to the open chute flap position of FIG. 5C. Any suitable structure can be used to attach chute flap CF' to housing H such as a hinge rod 50 as illustrated in FIGS. 5A and 5B as an example. It can be understood that hinge rod 50 can pass through a portion of deck D of housing H if desired. Chute flap CF' can be biased, such as by a torsion spring 52, toward either its closed chute flap position or its open chute flap position as desired as with chute flap CF discussed hereinabove. It is contemplated that wall portion 40' of chute flap CF' can be flush with wall W when chute flap CF' is in its closed chute flap position. The function of chute apparatus CA' can be the same as for chute apparatus CA except for the structural and attachment differences for chute flap CF' as described. Once chute flap CF' is in its open chute flap position as shown in FIG. 5C, one or more side edges of retaining flap RF, such as side edge 20A of second portion 16 for example, can abut and provide physical support to chute flap CF' to maintain chute flap CF' in its open chute flap position and/or chute flap CF' can be biased in the open chute flap position.

It is therefore seen from the above description that the subject matter disclosed herein provides chute apparatuses and methods which can simply and easily be used with a mowing machine in a configuration to selectively maintain cut material such as grass clippings within the housing, such as for mulching, or in a configuration to discharge the cut material from the housing through a chute by selectively and easily opening a discharge chute. The change from one configuration to the other can be made very simply and easily by quick manual movement of one or more flaps as described herein and without the need for tools. As a result, the inconvenience associated with the location and attachment of separate chute accessories can be eliminated without compromising the versatility of the mowing machine. As can appreciated by one of ordinary skill in the art, certain features of the above-described embodiments may be interchanged or omitted from additional embodiments as desired.

It will be understood that various details of the subject matter disclosed herein may be changed without departing from the scope of the subject matter. Furthermore, the foregoing description is for the purpose of illustration only, and not for the purpose of limitation.

What is claimed is:

1. A movable chute apparatus for a mowing machine, the chute apparatus comprising:
   a. a chute flap attached to a housing of a mowing machine, the chute flap being movable between a closed chute flap position and an open chute flap position wherein the chute flap provides a discharge chute for discharging material from the housing; and
   b. a retaining flap having a first flat portion extending along a first plane and a second flat portion extending along a second plane different from the first plane, the retaining flap being moveably attached to the housing of the mowing machine for movement of at least a portion of the retaining flap in an at least generally vertical direction away from the housing, the retaining flap being movable independent of the chute flap between a retaining position and a non-retaining position wherein the retaining flap can in its retaining position provide support to maintain the chute flap in either its closed or open chute flap position.

2. The movable chute apparatus according to claim 1, wherein the chute flap is pivotally attached to the housing.

3. The movable chute apparatus according to claim 1, wherein the chute flap is biased toward either its open chute flap position or its closed chute flap position.

4. The movable chute apparatus according to claim 1, wherein the chute flap further comprises a flange portion and a wall portion.

5. The moveable chute apparatus according to claim 1, wherein the retaining flap is pivotally attached to the housing.

6. The movable chute apparatus according to claim 1, wherein the retaining flap is biased toward its retaining position.

7. The movable chute apparatus according to claim 1, wherein the retaining flap further comprises a first section and a second section, the second section being adapted for securing the chute flap in its closed chute flap position.

8. The movable chute apparatus according to claim 1, wherein the chute flap and the retaining flap are both rotatable about different axes.

9. A movable chute apparatus for a mowing machine, the chute apparatus comprising:
   a. a chute flap attached to a housing of a mowing machine, the chute flap being movable between a closed chute flap position wherein the chute flap can provide a portion of the housing and an open chute flap position wherein the chute flap can provide a discharge chute for discharging material from the housing; and
   b. a retaining flap having a first flat portion extending along a first plane and a second flat portion extending along a second plane different from the first plane, the retaining flap being moveably attached to the housing of the mowing machine for movement of at least a portion of the retaining flap in an at least generally vertical direction away from the housing, the retaining flap being movable independent of the chute flap between a retaining position and a non-retaining position, at least a portion of the retaining flap being adapted for overlapping at least a portion of the chute flap when the chute flap is in its closed chute flap position.

10. The movable chute apparatus according to claim 9, wherein the chute flap is pivotally attached to the housing.

11. The movable chute apparatus according to claim 9, wherein the chute flap is biased toward either its open chute flap position or its closed chute flap position.

12. The movable chute apparatus according to claim 9, wherein the chute flap further comprises a flange portion and a wall portion.

13. The movable chute apparatus according to claim 9, wherein the retaining flap is pivotally attached to the housing.

14. The movable chute apparatus according to claim 9, wherein the retaining flap is biased toward its retaining position.

15. The movable chute apparatus according to claim 9, wherein the retaining flap further comprises a first section and a second section, the second section being adapted for securing the chute flap in its closed chute flap position.

16. The movable chute apparatus according to claim 9, wherein the chute flap and the retaining flap are both rotatable about different axes.

17. A movable chute apparatus for a mowing machine, the chute apparatus comprising:
   a. a chute flap attached to a housing of a mowing machine, the chute flap being movable between a closed chute flap position and an open chute flap position wherein the chute flap provides a discharge chute for discharging material from the housing; and
   b. a retaining flap having a first flat portion extending along a first plane and pivotally attached to the housing of the mowing machine and a second flat portion extending along a second plane different from the first plane and disposed at least generally perpendicularly to the first portion, the retaining flap being movable independent of the chute flap between a retaining position and a non-retaining position wherein the second portion of the retaining flap is adapted to overlap at least a portion of the chute flap to maintain the chute flap in its closed chute flap position and wherein at least a portion of the retaining flap is moveable in a direction at least generally vertically away from the housing.

18. The movable chute apparatus according to claim 17 wherein the chute flap and the retaining flap are both rotatable about substantially perpendicular axes.

19. A method for moving a chute apparatus of a mowing machine, the method comprising:
   a. lifting a retaining flap having a first flat portion extending along a first plane and a second flat portion extending along a second plane different from the first plane, the retaining flap being moveably attached to a housing on a mowing machine, wherein lifting the retaining flap moves the retaining flap from a retaining position to a non-retaining position by pivoting the retaining flap along a first axis wherein at least a portion of the retaining flap moves in a direction at least generally vertically away from the housing for the retaining flap to allow a chute flap attached to the mowing machine to pivot independent of the retaining flap along a second axis from a closed position to an open position whereby the chute flap provides a discharge chute; and
   b. wherein the first axis and the second axis are substantially perpendicular to one another.

20. The method of claim 19 further comprising returning the retaining flap to the retaining position where the retaining flap provides support to maintain the chute flap in the open chute flap position.

* * * * *